United States Patent [19]

Watts

[11] 4,288,474

[45] Sep. 8, 1981

[54] CONVEYOR BELTING

[75] Inventor: Gilbert E. Watts, Beverley, England

[73] Assignee: J. H. Fenner & Co. Limited, Hull, England

[21] Appl. No.: 156,039

[22] Filed: Jun. 3, 1980

[51] Int. Cl.³ .............................................. B05D 3/12
[52] U.S. Cl. .................................... 427/290; 156/137; 156/154
[58] Field of Search ............................... 156/137–142, 156/153–154; 152/356, 357, 359; 57/201, 251, 902; 428/397, 399, 400; 427/290, 289

[56] References Cited

U.S. PATENT DOCUMENTS

| | | | |
|---|---|---|---|
| 1,501,493 | 7/1924 | Koplin | 427/290 |
| 2,113,434 | 4/1938 | Schuhmann | 156/153 |
| 2,800,701 | 7/1957 | Watts et al. | 156/137 X |
| 3,031,364 | 4/1962 | Perkins | 156/141 X |
| 3,313,642 | 4/1967 | Waugh | 156/153 X |
| 3,323,975 | 6/1967 | Marzocchi | 57/251 X |
| 3,503,199 | 3/1970 | Nesbitt-Dufort | 57/251 X |
| 3,927,229 | 12/1975 | Rall et al. | 427/290 X |

*Primary Examiner*—David A. Simmons
*Attorney, Agent, or Firm*—Gipple & Hale

[57] ABSTRACT

The invention provides a method for manufacturing textile reinforced conveyor beltings comprising subjecting the outer surfaces of a textile carcass constituted wholly of synthetic fibre yarns, or comprising at least a major proportion of synthetic fibre yarns, to a brushing or raising action so as to break and raise or to roughen a proportion of the filaments in the extreme outer yarns prior to impregnation and/or coating of the carcass, for example with PVC or rubber or other polymeric or elastomeric material, so as to improve bondability between the synthetic fibre and the impregnating or coating material.

12 Claims, No Drawings

CONVEYOR BELTING

DESCRIPTION

This invention relates to mechanical beltings and more particularly to conveyor beltings.

A common type of conveyor belting comprises a textile fabric core impregnated and/or coated with P.V.C. (polyvinylchloride) or rubber. The textile fabric may comprise a laminated structure formed from a plurality of individual layers or plies of woven fabric or it may comprise a so-called solid woven construction wherein the fabric core is produced by the simultaneous weaving of a multi-layer structure in which the layers are integrally combined by means of binder threads. Good adhesion between the PVC or rubber and the textile material is essential in order to produce belting of satisfactory quality. In earlier type beltings, adhesion presented no particular problem since carcasses were woven from yarns of natural fibre, usually cotton, which are readily bondable to either PVC or rubber. However, with the advent of relatively smooth surfaced synthetic filament fibres and their inclusion in belting carcass weaves in progressively increasing proportions in successive generations of beltings, it became necessary to develop and utilize chemical adhesion promoting systems to compensate for the reduced adhesion due to the diminished cotton content. This trend towards increased usage of synthetic fibres in conveyor belting carcass has reached the ultimate stage where beltings are now known which are reinforced entirely with synthetic fibre yarns. Unfortunately, the bonding systems, upon which such beltings are largely dependent for adhesion, are not entirely reliable unless stringent supervision is exercised during the manufacturing process and even then do not always achieve the requisite high degree of bonding.

One known method of improving the bondability of synthetic fibre carcasses is to include a proportion of staple fibre yarn in the weave in order to give a greater degree of mechanical interlocking with the polymer but this improvement in adhesion is achieved only at the expense of some loss in strength efficiency in comparison with synthetic filament yarns.

The object of the present invention is to provide an improved method for manufacturing PVC or rubber conveyor beltings reinforced with a textile fabric core constituted wholly of synthetic fibre yarns or comprising at least a high proportion of synthetic fibre yarns.

According to the invention, a method for manufacturing textile reinforced conveyor beltings comprises subjecting the outer surfaces of a textile carcass constituted wholly of synthetic fibre yarns, or comprising at least a major proportion of synthetic fibre yarns, to a brushing or raising action so as to break and raise or to roughen a proportion of the filaments in the extreme outer yarns prior to impregnation and/or coating of the carcass, for example with PVC or rubber or other polymer or elastomeric material.

In one form of the invention, the raising operation is performed by feeding the carcass between rollers which may be powered and which are provided at their outer surface with a clothing of spikes or bristles made from wires or some other suitable material.

In a preferred form of the invention, the carcass is brushed with a reciprocating action in a direction across the width of the carcass. For example, the carcass may be fitted between a pair of brushes extending across the full width of the carcass. The brushes may be mounted on a carrier arranged to execute the reciprocating motion by conventional means. Preferably the brushes comprise nylon bristles.

It will be appreciated that where the brushes are reciprocating across the width of the carcass, the carcass may be moved longitudinally or the brush carrier may be moved longitudinally of the carcass in order that the entire top and bottom surfaces of the carcass may be brushed. Mechanical means may be provided to effect this movement of the carcass or the brush carrier.

In general, the brushes may have bristles of nylon, steel wire or other suitable material.

The marked improvement in adhesion between the outer covers and the textile carcass of belting made in accordance with the invention can be seen from the test results instanced below in which comparison is made with belting, identical in every respect apart from the raising provided at the outer surfaces of the carcass. In the tabulated results, raised and unraised carcass beltings are designated A and B respectively and relate to a 3-ply, solid woven belting having exclusively filament nylon yarns in the warp and a mixture of filament nylon yarns and cotton yarns in the weft in the proportion 53% nylon, 47% cotton. The tests were conducted by tearing the PVC cover from the textile carcase in the jaws of a tensile testing machine with a constant rate of jaw separation. Maximum and minimum forces recorded during the separation were noted and the results quoted represent the average of 4 such tests.

| | Cover Adhesion of Textile Newtons per centimeter width of belting | |
|---|---|---|
| | Belting A | Belting B |
| Minimum | 38.4 | 24.4 |
| Maximum | 69.7 | 45.4 |
| Average | 57.9 | 35.1 |

The raising of the carcass beltings was effected by both rotary and reciprocating brushes but there was no significant difference in the test results.

We claim:

1. A method for manufacturing textile reinforced conveyor beltings of the solid woven type wherein the textile carcass has been produced by the simultaneous weaving of a multilayer structure in which the layers are integrally combined by means of binder threads which comprises subjecting the outer surfaces of a solid woven textile carcass comprising at least a major proportion of synthetic fiber yarns to a brushing action so as to roughen a proportion of the filaments in the outermost yarns of the carcass, and then impregnating or coating the carcass with a polyvinylchloride material.

2. A method as claimed in claim 1, wherein said solid woven belting has exclusively filament nylon yarns in the warp, and a mixture of filament nylon yarns and cotton yarns in the weft.

3. A method as claimed in claim 1 wherein the carcass is impregnated or coated with rubber rather than PVC.

4. A method as claimed in claim 1 wherein the brushing action is performed by feeding the carcass between rotating rollers which are provided at their outer surface with a clothing of spikes or bristles.

5. A method as claimed in claim 1 wherein the carcass is brushed with a reciprocating action in a direction across the width of the carcass.

6. A method as claimed in claim 5 wherein the carcass is fitted between a pair of brushes extending across the full width of the carcass.

7. A method as claimed in claim 6 wherein the brushes are mounted on a carrier arranged to execute the reciprocating motion.

8. A method as claimed in claim 6 wherein means are provided to move the carcass or the brush carrier longitudinally of the carcass in order that the entire top and bottom surfaces of the carcass may be brushed.

9. A method as claimed in claim 1 wherein the brushing is effected by bristles of nylon or steel wire.

10. A method as claimed in claim 1 wherein the carcass is constituted wholly of synthetic fibre yarns.

11. A method as claimed in claim 1 wherein the brushing action breaks and raises a proportion of the filaments in the outermost yarns of the carcass.

12. A method for manufacturing textile reinforced conveyor beltings of the solid woven type where the textile carcass has been produced by the simultaneous weaving of a multi-layer structure in which layers are integrally combined by means of binder threads comprising the steps of brushing the outer surface of a solid woven textile carcass constructed with smooth surfaced synthetic fiber filaments in a direction across the width of the carcass so as to break and raise a proportion of the filaments in the extreme outer yarns of the carcass to improve bondability between the synthetic fiber filaments and an impregnating or coating material, and impregnating and/or coating the brushed carcass with a polyvinylchloride material.

* * * * *